United States Patent
Baird et al.

(10) Patent No.: US 11,534,984 B2
(45) Date of Patent: Dec. 27, 2022

(54) HYBRID METALLIC/COMPOSITE JOINT WITH INTEGRAL BEARING

(71) Applicant: GOODRICH CORPORATION, Charlotte, NC (US)

(72) Inventors: Bradley William Baird, Grimsby (CA); Jason Bradley Allen, Waco, TX (US)

(73) Assignee: Goodrich Corporation, Charlotte, NC (US)

( * ) Notice: Subject to any disclaimer, the term of this patent is extended or adjusted under 35 U.S.C. 154(b) by 932 days.

(21) Appl. No.: 16/379,649

(22) Filed: Apr. 9, 2019

(65) Prior Publication Data
US 2020/0324491 A1    Oct. 15, 2020

(51) Int. Cl.
| | | |
|---|---|---|
| *B29C 65/64* | (2006.01) | |
| *B64C 25/32* | (2006.01) | |
| *F16B 7/02* | (2006.01) | |
| *F16L 19/065* | (2006.01) | |
| *F16L 19/08* | (2006.01) | |
| *F16L 21/00* | (2006.01) | |

(52) U.S. Cl.
CPC .............. *B29C 65/64* (2013.01); *B64C 25/32* (2013.01); *F16B 7/02* (2013.01); *F16L 19/065* (2013.01); *F16L 19/08* (2013.01); *F16L 21/007* (2013.01)

(58) Field of Classification Search
CPC ............ B29C 65/64; B64C 25/32; F16B 7/02
See application file for complete search history.

(56) References Cited

U.S. PATENT DOCUMENTS

| 4,647,078 | A | 3/1987 | Lundy |
|---|---|---|---|
| 5,303,958 | A | 4/1994 | Hyatt et al. |
| 5,318,374 | A | 6/1994 | Rumberger |
| 6,734,805 | B2 | 5/2004 | Johnson |
| 8,205,315 | B2 | 6/2012 | Mullen et al. |
| 8,262,825 | B2 | 9/2012 | Fahey et al. |
| 9,482,266 | B2 | 11/2016 | Dewhirst |
| 9,568,040 | B2 | 2/2017 | Ganis |
| 9,689,514 | B2 | 6/2017 | Leslie et al. |
| 9,726,325 | B2 | 8/2017 | Ganis et al. |

(Continued)

FOREIGN PATENT DOCUMENTS

| DE | 102014000134 | 7/2014 |
|---|---|---|
| EP | 3076048 | 10/2016 |
| EP | 3133298 | 2/2017 |

OTHER PUBLICATIONS

European Patent Office, European Office Action dated Jan. 12, 2022 in Application No. 19215321.1.

(Continued)

*Primary Examiner* — Christopher D Hutchens
*Assistant Examiner* — Steven J Shur
(74) *Attorney, Agent, or Firm* — Snell & Wilmer L.L.P.

(57) ABSTRACT

A metallic-composite joint fitting is provided. The fitting may comprise a composite structure, an integral bearing comprising a first frustoconical portion and a second frustoconical portion each having a complimentary shape to the composite structure, a sleeve comprising a third frustoconical portion coupled to a cylindrical bearing surface of the integral bearing, and a metallic end fitting coupled to the third frustoconical portion, wherein the metallic end fitting comprises a bearing portion contacted with the cylindrical bearing surface.

16 Claims, 6 Drawing Sheets

(56) References Cited

U.S. PATENT DOCUMENTS

| | | | |
|---|---|---|---|
| 9,810,353 B2 | 11/2017 | Leslie et al. | |
| 2017/0051767 A1* | 2/2017 | Giannakopoulos | ..... F16B 9/054 |
| 2017/0102012 A1* | 4/2017 | Ganis | ...................... B64C 25/18 |
| 2018/0283424 A1 | 10/2018 | Beale | |

OTHER PUBLICATIONS

European Patent Office, European Search Report dated Aug. 4, 2020 in Application No. 19215321.1.
European Patent Office, European Office Action dated Jul. 26, 2021 in Application No. 19215321.1.

\* cited by examiner

HYBRID METALLIC/COMPOSITE JOINT WITH INTEGRAL BEARING

FIELD

The present disclosure relates to composite tube assemblies and methods of manufacture of composite tube assemblies, and, more specifically, to aircraft retractable landing gear systems having metallic component interfaces to composite tubes.

BACKGROUND

Composite tubes are often used due to their high strength and low weight in industries and applications where weight is a significant design factor, such as in the aircraft and automotive industries. Landing gear supports an aircraft while the aircraft is on the ground and tend to comprise metallic components capable of withstanding the high structural loads environment of aircraft landing. Landing gear may include one or more wheels and a shock strut assembly in order to attenuate the forces associated with landing or ground operations. Composite tubes may be used to interface between metallic structures and thereby tend to reduce component weight. The structures may be subjected to axial tensile and compressive loads, bending loads, and torsional loads. Working loads may be transmitted directly through to the composite structure which may benefit of a connector having an optimized load path between metallic structures and the composite structure.

SUMMARY

In various embodiments, a metallic-composite joint fitting is provided comprising a composite structure, an integral bearing comprising a first frustoconical portion and a second frustoconical portion each having a complimentary shape to the composite structure, a sleeve comprising a third frustoconical portion coupled to a cylindrical bearing surface of the integral bearing, and a metallic end fitting coupled to the third frustoconical portion, wherein the metallic end fitting comprises a bearing portion contacted with the cylindrical bearing surface.

In various embodiments, the composite structure is wrapped over the integral bearing. In various embodiments, the composite structure comprises a cylindrical portion and a flared end portion, wherein the flared end portion has a complimentary shape to each of the first frustoconical portion, the second frustoconical portion, and the third frustoconical portion. In various embodiments, the sleeve is monolithic with the bearing. In various embodiments, the sleeve comprises a flange. In various embodiments, the bearing portion comprises a flange. In various embodiments, the metallic end fitting comprises an externally threaded portion coupled to the third frustoconical portion at an internally threaded surface of the third frustoconical portion. In various embodiments, the externally threaded portion has a relatively smaller diameter than the bearing portion. In various embodiments, a relative length ratio of the externally threaded portion to the bearing portion is 1:3 or less. In various embodiments, the integral bearing comprises at least one of a steel, a stainless steel, a titanium, a titanium alloy, an aluminum, an aluminum alloy, a bearing metal, a composite, a plastic, a thermoplastic, a glass, or a ceramic.

In various embodiments, a landing gear system is provided comprising a shock strut coupled to an axle, a wheel coupled to the axle, and a metallic-composite joint fitting comprising a composite structure, an integral bearing comprising a first frustoconical portion and a second frustoconical portion each having a complimentary shape to the composite structure, a sleeve comprising a third frustoconical portion coupled to a cylindrical bearing surface of the integral bearing, and a metallic end fitting coupled to the third frustoconical portion, wherein the metallic end fitting comprises a bearing portion contacted with the cylindrical bearing surface.

In various embodiments, the composite structure is wrapped over the integral bearing. In various embodiments, the composite structure comprises a cylindrical portion and a flared end portion, wherein the flared end portion has a complimentary shape to each of the first frustoconical portion, the second frustoconical portion, and the third frustoconical portion. In various embodiments, the sleeve is monolithic with the bearing. In various embodiments, the sleeve comprises a flange. In various embodiments, the bearing portion comprises a flange. In various embodiments, the metallic end fitting comprises an externally threaded portion coupled to the third frustoconical portion at an internally threaded surface of the third frustoconical portion. In various embodiments, the externally threaded portion has a relatively smaller diameter than the bearing portion. In various embodiments, a relative length ratio of the externally threaded portion to the bearing portion is 1:3 or less.

In various embodiments, a method of joining a composite structure and a metallic end fitting comprises coupling an integral bearing about a sleeve, wrapping the composite structure about the integral bearing to form a flared end portion of the composite structure, inserting a coupling portion of the metallic end fitting into the integral bearing, and engaging a bearing portion of the coupling portion with a cylindrical bearing surface and coupling an externally threaded portion of the coupling portion to the sleeve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
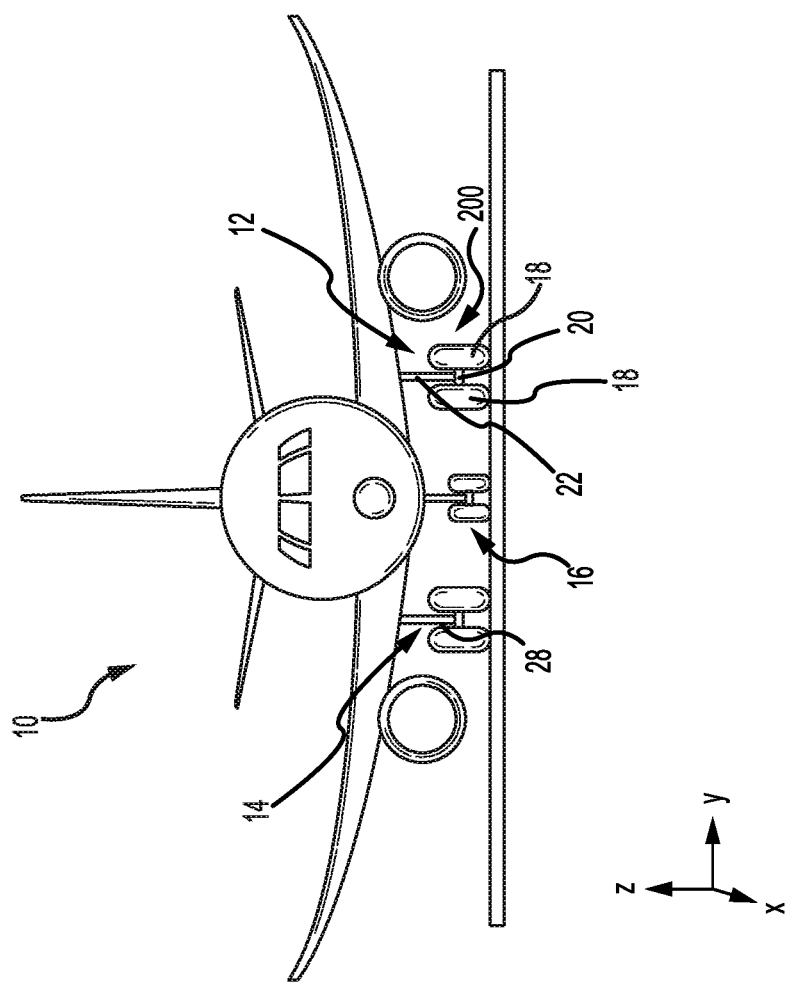
FIG. 1 illustrates an aircraft, in accordance with various embodiments.

With reference to FIG. 1, an aircraft 10 in accordance with various embodiments may comprise aircraft systems, for example, one or more landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off, and land without damage and may comprise wheels and an oleo strut, also referred to as a shock strut, comprising a strut cylinder and a strut piston filled with a hydraulic fluid. For example, landing gear 12 may include wheels 18 coupled by an axle 20 and a shock strut assembly 22 comprising a metallic-composite joint fitting 200.

Figure 2A:
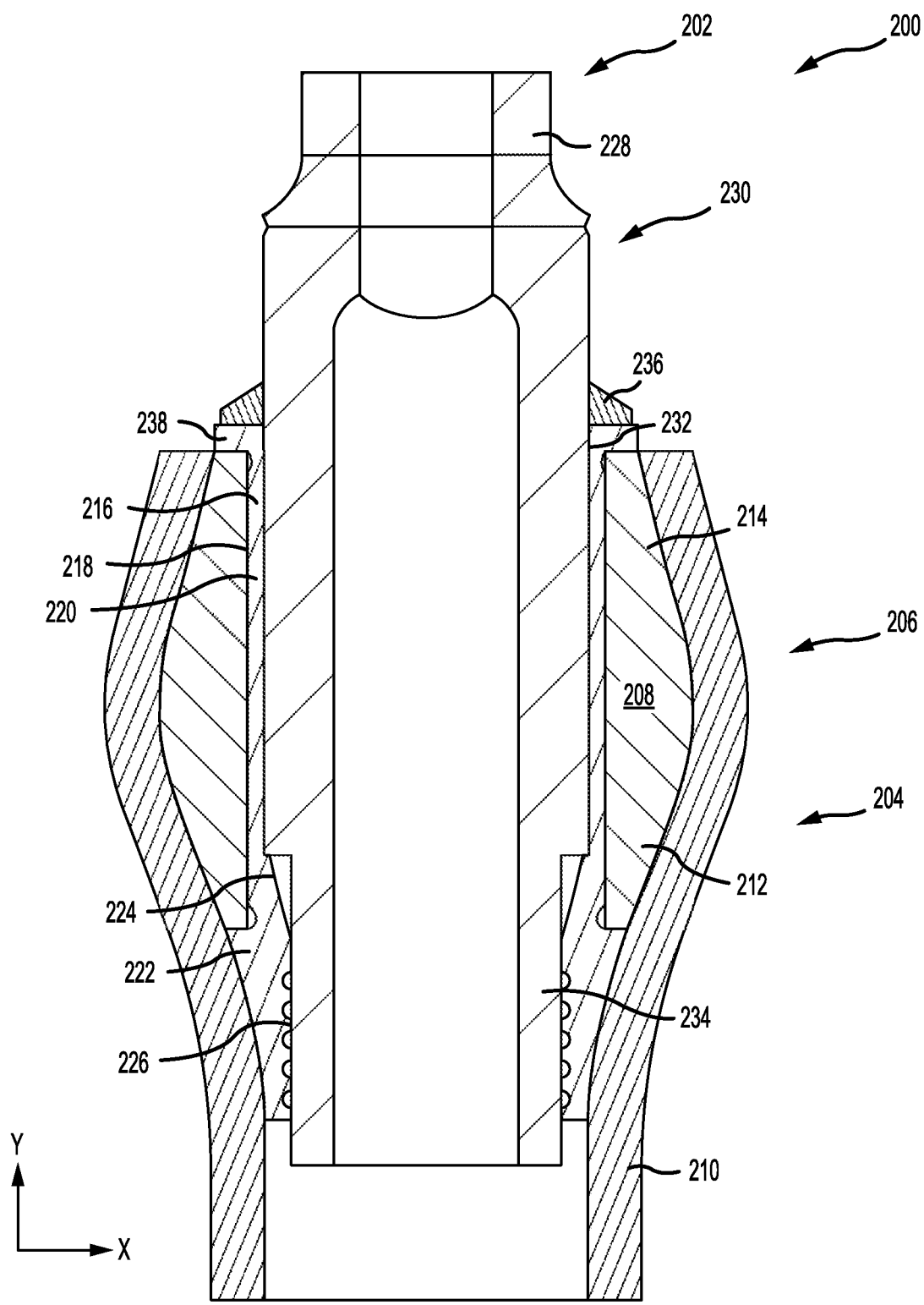
FIG. 2A illustrates a metallic-composite joint fitting, in accordance with various embodiments.

In various embodiments and with additional reference to FIGS. 2A and 2B, metallic-composite joint fitting 200 (hereinafter "fitting") is illustrated in planar cross section of the XY-plane. Fitting 200 comprises a coupling between a metallic end fitting 202 and a composite structure 204. Composite structure 204 comprises a flared end portion 206 wrapped about an integral bearing 208 having a complimentary shape to the flared end portion 206. The flared end portion 206 extends from a cylindrical portion 210 of the composite structure 204. The flared end portion is defined by a first frustoconical portion 212 and a second frustoconical portion 214 of the integral bearing 208. The first frustoconical portion 212 and the second frustoconical portion 214 are contoured such that the flared end portion 206 increases in diameter from the cylindrical portion 210 along the first frustoconical portion 212 to a maximum diameter at an approximate midpoint of the integral bearing 208 and decreases in diameter from the maximum diameter along the second frustoconical portion 214. Stated another way, the flared portion and the integral bearing surface may diverge from the diameter of the cylindrical portion 210 and converge toward the diameter of the cylindrical portion 210 along the Y-axis. In various embodiments, the integral bearing 208 may comprise one of a steel, a stainless steel, a titanium, a titanium alloy, an aluminum, an aluminum alloy, a bearing metal, a composite, a plastic, a thermoplastic, a glass, a ceramic and/or the like. In various embodiments, the integral bearing 208 may comprise a single piece or may comprise several segments.

In various embodiments, a sleeve 216 may be coupled to the integral bearing 208 at a cylindrical bearing surface 218 of the integral bearing 208. The sleeve 216 may comprise a bearing surface portion 220 and a third frustoconical portion 222 disposed proximate the cylindrical portion 210. In various embodiments, the sleeve 216 may comprise one of a steel, a stainless steel, a titanium, a titanium alloy, and or other suitable material for a threaded surface. The third frustoconical portion 222 may be coupled to the first frustoconical portion 212 and the bearing surface portion 220. The bearing surface portion 220 may comprise a cylindrical structure defined by the diameter of the cylindrical bearing surface 218. The third frustoconical portion 222 may have a relatively reduced inner diameter from the inner diameter of the bearing surface portion 220. In various embodiments, the interior wall of the sleeve may curve relatively inward at the transition 224 between the bearing surface portion 220 and the third frustoconical portion 222 thereby increasing the sleeve 216 wall thickness at the transition 224. The third frustoconical portion 222 includes an internally threaded surface 226 at the inner diameter of the third frustoconical portion 222. In various embodiments, the sleeve 216 may include a flange 238 at a distal end of the third frustoconical portion 222.

In various embodiments, the metallic end fitting 202 comprises a shank portion 228 and a coupling portion 230. The coupling portion 230 comprises a bearing portion 232 and an externally threaded portion 234. The externally threaded portion 234 has a relatively reduced diameter than the bearing portion 232 and is configured to engage with the internally threaded surface 226 of the third frustoconical portion 222. The externally threaded portion 234 is at a distal end of the coupling portion 230 form the shank portion 228. The bearing portion 232 extends between the externally threaded portion 234 and the shank portion 228. In various embodiments, the bearing portion 232 may include a flange 236 delimiting the extent of the bearing portion 232 into the integral bearing 208. Coupling portion 230 is inserted into the integral bearing 208 and the bearing portion 232 engages with cylindrical bearing surface 218 (e.g., via bearing surface portion 220 of sleeve 216). In various embodiments flange 236 of bearing portion 232 may contact flange 238 of sleeve 216 in response to engaging externally threaded portion 234 with the internally threaded surface 226 of the third frustoconical portion 222. In various embodiments, the bearing portion 232 may comprise about $2/3^{rd}$ of the length (along the Y-axis) of coupling portion 230 while the externally threaded portion 234 may comprise about $1/3^{rd}$ of the length (along the Y-axis) of the coupling portion 230 where about in this context means±10%. Stated another way, a relative length ratio of the externally threaded portion to the bearing portion is 1:3 or less.

Figure 2B:
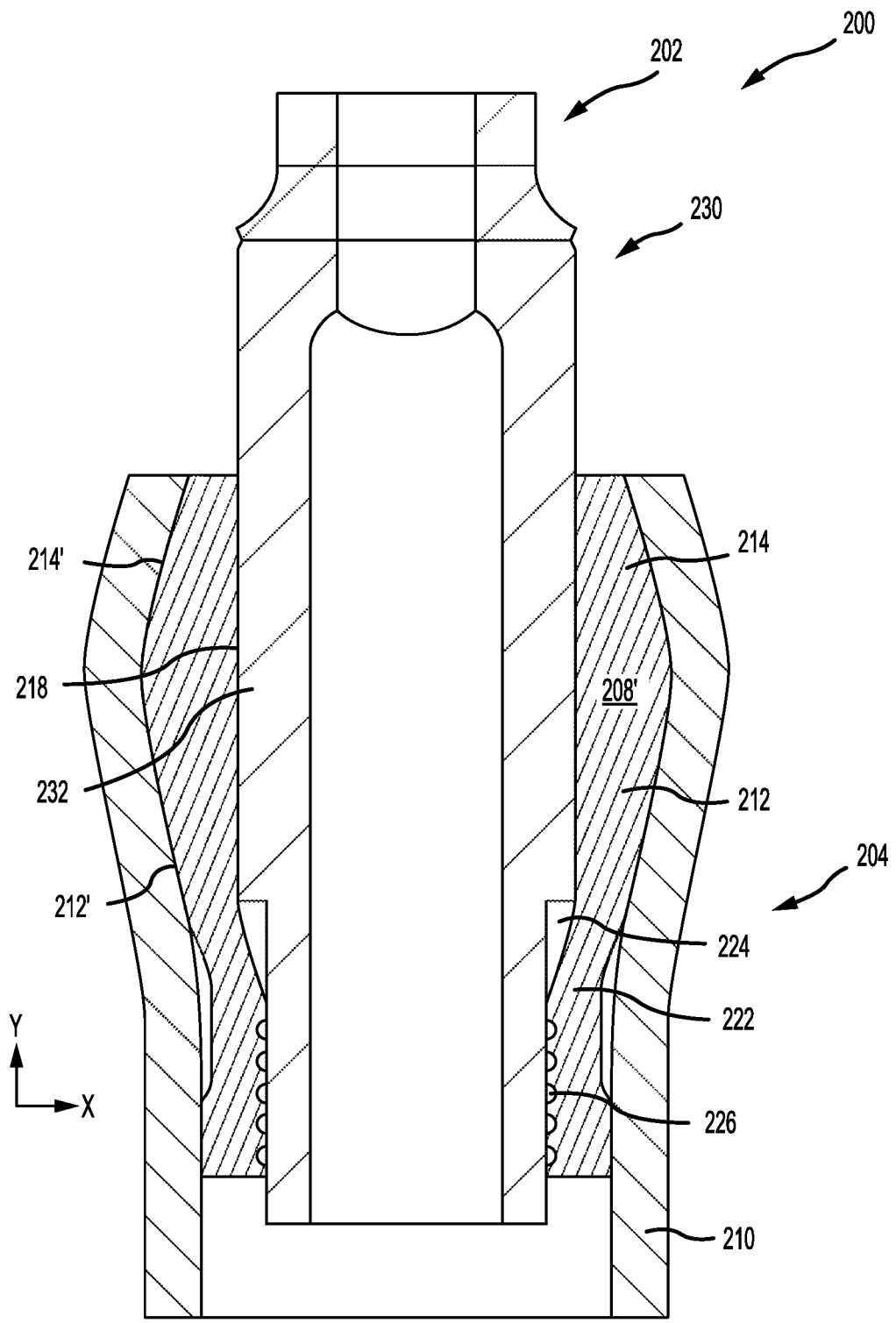
FIG. 2B illustrates a metallic-composite joint fitting, in accordance with various embodiments.

In various embodiments and with particular reference to FIG. 2B, an integral bearing 208' is illustrated in planar cross section through the YZ-plane. Integral bearing 208' comprises features, geometries, construction, manufacturing techniques, and/or internal components similar to integral bearing 208. Integral bearing 208' differs in that the sleeve 216 is monolithic with the integral bearing 208'. In this regard the integral bearing 208' may comprise a sleeve material such as, for example, one of a steel, a stainless steel, a titanium, and or other suitable material for a threaded coupling such as internally threaded surface 226.

Figure 3A:
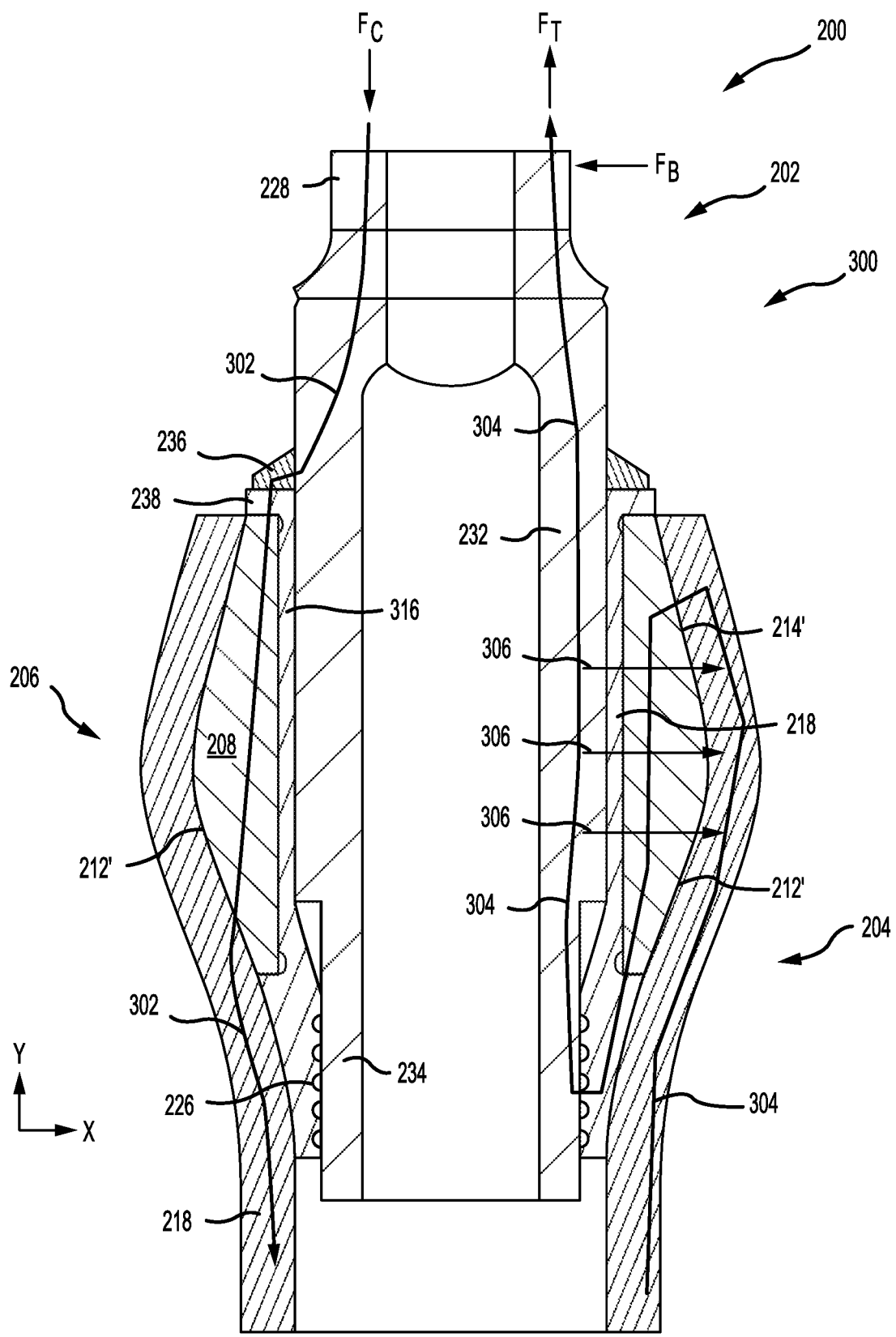
FIG. 3A illustrates load paths in a metallic-composite joint fitting, in accordance with various embodiments.
Figure 3B:
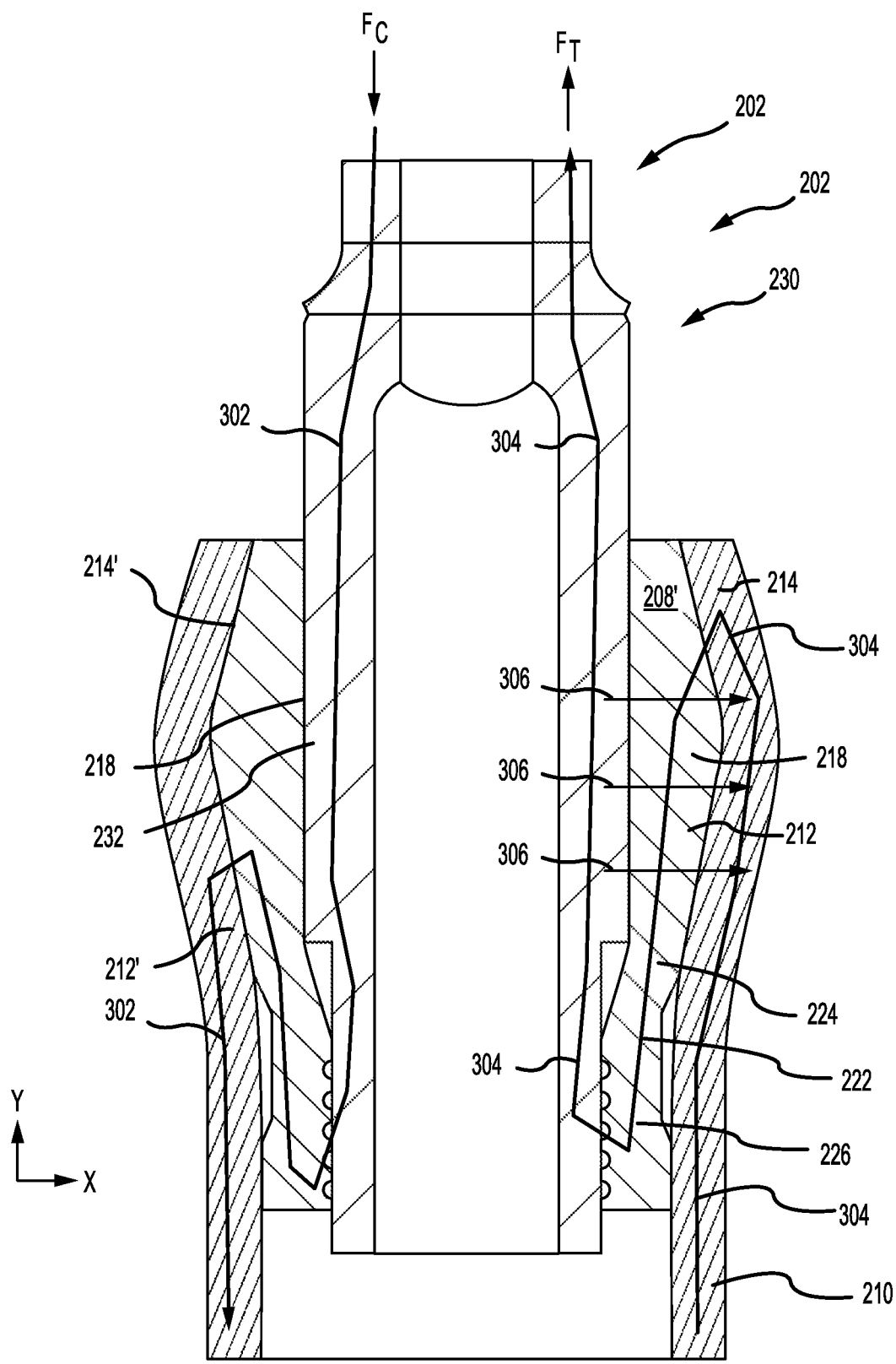
FIG. 3B illustrates load paths in a metallic-composite joint fitting, in accordance with various embodiments.
Figure 4:
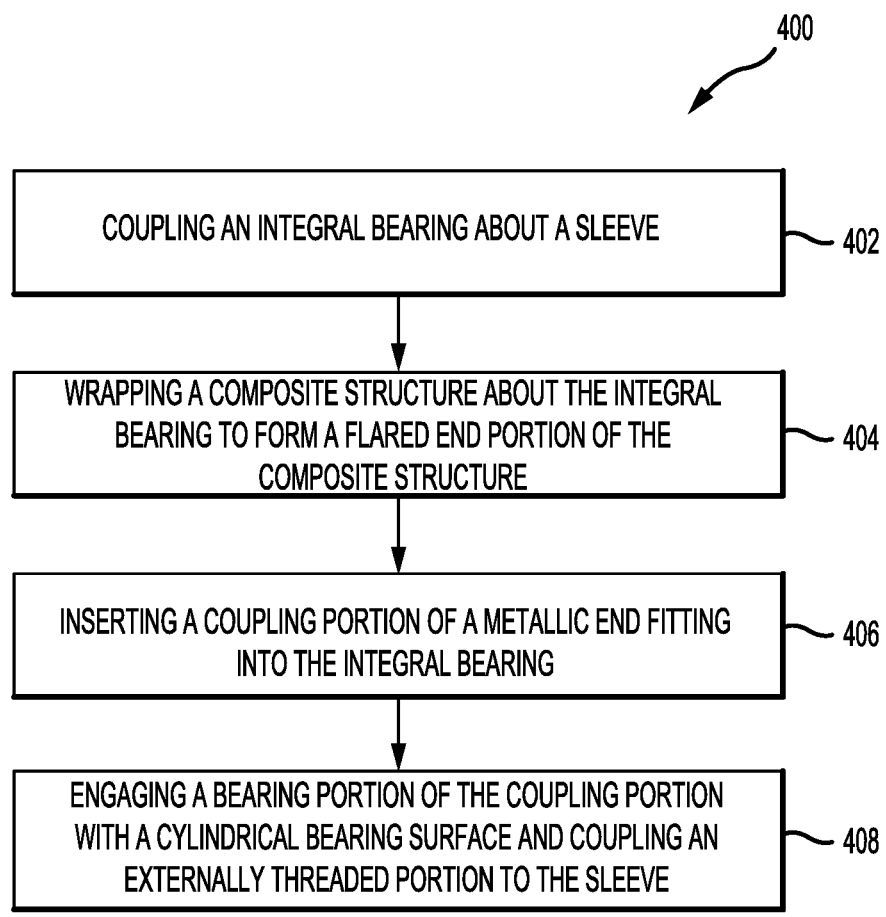
FIG. 4 illustrates a method of joining a composite structure and a metallic end fitting, in accordance with various embodiments.

In various embodiments and with additional reference to FIGS. 3A and 3B, fitting 200 may be optimized to carry compressive and tension loads via threaded surfaces while carrying bending loads at non-threaded bearing surfaces. In this regard, fitting 200 may tend to benefit of improved bending load performance. Fitting 200 is illustrated in cross section overlaid with optimized load paths 300 for axial tension, axial compression, and radial bending loads applied at metallic end fitting 202. A compressive force Fc applied at the metallic end fitting 202 travels as shown by arrows 302 through internally threaded surface 226 into sleeve 216 via the coupling between externally threaded portion 234 and internally threaded surface 226. Sleeve 216 may transmit the compressive force Fc to the integral bearing 208 via flange 238. In various embodiments, flange 236 may also transmit a portion of the compressive force Fc to the integral bearing 208, for example, via flange 238. Alternatively, the compressive force Fc may be transferred entirely through the threaded surface 226 to bearing 208' as shown in FIG. 3B. The integral bearing 208 transmits the force to the flared end portion 206 of the composite structure 204 via the first frustoconical bearing surface 212' and thereby the cylindrical portion 210 of composite structure 204. As shown by arrows 304, a tension force FT applied at the metallic end fitting 202 is transmitted via internally threaded surface 226 into externally threaded portion 234 and into the flared end portion 206 of the composite structure 204 via the second frustoconical bearing surface 214' and thereby the cylindrical portion 210 of composite structure 204.

A bending load $F_B$ is applied at the metallic end fitting 202 and travels as shown by arrows 306 entirely (i.e., greater than 95% of the bending load) through cylindrical bearing surface 218 into the integral bearing 208. The integral bearing 208 passes the bending load through the first frustoconical bearing surface 212' and the second frustoconical bearing surface 214' into the flared end portion 206. The externally threaded portion 234 of the coupling portion 230 has a relatively reduced diameter in comparison to the diameter of the bearing portion 232 and a comparatively greater length. In this regard, the bending force $F_B$ may tend to be inhibited from passing through the internally threaded surface 226.

In various embodiments, a method 400 of joining a composite structure 204 and a metallic end fitting 202 may comprise coupling an integral bearing 208 about a sleeve 216 (step 402). Step 404 may include swaging the sleeve to retain the sleeve to the integral bearing 208. For example, flange 238 may be formed by swaging an end of sleeve 216. Method 400 includes wrapping the composite structure 204 over the integral bearing 208 to form a flared end portion 206 of the composite structure 204 (step 404). Method 400 includes inserting a coupling portion 230 of the metallic end fitting 202 into the integral bearing 208 (step 406). Method 400 includes engaging a bearing portion 232 of the coupling portion 230 with a cylindrical bearing surface 218 and coupling an externally threaded portion 234 of the coupling portion 230 to the sleeve 216 (step 408). In various embodiments, step 408 may include contacting a first flange 236 of the bearing portion 232 with a second flange 238 of the sleeve 216.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metallic-composite joint fitting, comprising:
    a composite structure for receiving a metallic end structure, the composite structure comprising:
        an integral bearing comprising a first frustoconical portion and a second frustoconical portion each having a complimentary shape to the composite structure; and
        a sleeve comprising a bearing surface portion, a third frustoconical portion at a first end of the bearing surface portion, and a flange at a second end of the bearing surface portion opposite to the first end, wherein a first surface of the bearing surface portion is coupled to a cylindrical bearing surface of the integral bearing; and
    the metallic end fitting coupled to the third frustoconical portion of the sleeve, wherein the metallic end fitting comprises a bearing portion in contact with a second surface opposite the first surface of the bearing surface portion of the sleeve.

2. The metallic-composite joint fitting of claim 1, wherein the composite structure is wrapped over the integral bearing.

3. The metallic-composite joint fitting of claim 2, wherein the composite structure comprises a cylindrical portion and a flared end portion, wherein the flared end portion has a complimentary shape to each of the first frustoconical portion, the second frustoconical portion, and the third frustoconical portion.

4. The metallic-composite joint fitting of claim 1, wherein the bearing portion of the metallic end fitting comprises a flange.

5. The metallic-composite joint fitting of claim 1, wherein the metallic end fitting comprises an externally threaded portion coupled to the third frustoconical portion at an internally threaded surface of the third frustoconical portion of the sleeve.

6. The metallic-composite joint fitting of claim 5, wherein the externally threaded portion has a relatively smaller diameter than the bearing portion.

7. The metallic-composite joint fitting of claim 5, wherein a relative length ratio of the externally threaded portion to the bearing portion is 1:3 or less.

8. The metallic-composite joint fitting of claim 1, wherein the integral bearing comprises at least one of a steel, a stainless steel, a titanium, a titanium alloy, an aluminum, an aluminum alloy, a bearing metal, a composite, a plastic, a thermoplastic, a glass, or a ceramic.

9. A landing gear system, comprising:
a shock strut coupled to an axle;
a wheel coupled to the axle; and
a metallic-composite joint fitting, comprising:
a composite structure for receiving a metallic end structure, the composite structure comprising:
an integral bearing comprising a first frustoconical portion and a second frustoconical portion each having a complimentary shape to the composite structure; and
a sleeve comprising a bearing surface portion, a third frustoconical portion at a first end of the bearing surface portion, and a flange at a second end of the bearing surface portion opposite to the first end, wherein a first surface of the bearing surface portion is coupled to a cylindrical bearing surface of the integral bearing; and
the metallic end fitting coupled to the third frustoconical portion of the sleeve, wherein the metallic end fitting comprises a bearing portion in contact with a second surface opposite the first surface of the bearing surface portion of the sleeve.

10. The landing gear system of claim 9, wherein the composite structure is wrapped over the integral bearing.

11. The landing gear system of claim 10, wherein the composite structure comprises a cylindrical portion and a flared end portion, wherein the flared end portion has a complimentary shape to each of the first frustoconical portion, the second frustoconical portion, and the third frustoconical portion.

12. The landing gear system of claim 9, wherein the bearing portion of the metallic end fitting comprises a flange.

13. The landing gear system of claim 9, wherein the metallic end fitting comprises an externally threaded portion coupled to the third frustoconical portion at an internally threaded surface of the third frustoconical portion of the sleeve.

14. The landing gear system of claim 13, wherein the externally threaded portion has a relatively smaller diameter than the bearing portion.

15. The landing gear system of claim 13, wherein a relative length ratio of the externally threaded portion to the bearing portion is 1:3 or less.

16. A method of joining a composite structure and a metallic end fitting, comprising:
coupling an integral bearing about a sleeve, wherein the sleeve comprises a bearing surface portion, a frustoconical portion at a first end of the bearing surface portion, and a flange at a second end of the bearing surface portion opposite to the first end and wherein a first surface of the bearing surface portion is coupled to a cylindrical bearing surface of the integral bearing;
wrapping the composite structure about the integral bearing to form a flared end portion of the composite structure;
inserting a coupling portion of the metallic end fitting into the sleeve; and
engaging a bearing portion of the coupling portion with a second surface opposite the first surface of the bearing surface portion of the sleeve and coupling an externally threaded portion of the coupling portion to an internally threaded portion of the frustoconical portion of the sleeve.

* * * * *